US011558440B1

United States Patent
Tadesse et al.

(10) Patent No.: US 11,558,440 B1
(45) Date of Patent: Jan. 17, 2023

(54) SIMULATE LIVE VIDEO PRESENTATION IN A RECORDED VIDEO

(71) Applicant: INTERNATIONAL BUSINESS MACHINES CORPORATION, Armonk, NY (US)

(72) Inventors: Girmaw Abebe Tadesse, Nairobi (KE); Celia Cintas, Nairobi (KE); Sarbajit K. Rakshit, Kolkata (IN); Komminist Weldemariam, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/472,946

(22) Filed: Sep. 13, 2021

(51) Int. Cl.
| | |
|---|---|
| *H04N 9/80* | (2006.01) |
| *H04L 65/61* | (2022.01) |
| *G11B 27/10* | (2006.01) |
| *G10L 15/26* | (2006.01) |
| *G06F 16/901* | (2019.01) |
| *G11B 27/036* | (2006.01) |
| *H04N 5/93* | (2006.01) |
| *G06N 3/04* | (2006.01) |

(52) U.S. Cl.
CPC .......... *H04L 65/61* (2022.05); *G06F 16/9024* (2019.01); *G10L 15/26* (2013.01); *G11B 27/036* (2013.01); *G11B 27/10* (2013.01); *G06N 3/0454* (2013.01)

(58) Field of Classification Search
CPC ....... H04L 65/61; G11B 27/10; G11B 27/036; G10L 15/26; G06F 16/9024; G06N 3/0454
USPC ....... 386/241, 248, 210, 223, 224, 226, 278, 386/285
See application file for complete search history.

(56) References Cited

U.S. PATENT DOCUMENTS

| | | | |
|---|---|---|---|
| 6,853,398 B2 | 2/2005 | Malzbender | |
| 8,421,805 B2 | 4/2013 | Bishop | |
| 2010/0158232 A1* | 6/2010 | Sylvain | ............... H04L 65/4038 379/202.01 |
| 2014/0082100 A1* | 3/2014 | Sammon | .............. G06Q 10/101 709/204 |

(Continued)

OTHER PUBLICATIONS

Geeksforgeeks, "Generative Adversarial Network (GAN)", Jan. 15, 2019, 11 Pages. https://www.geeksforgeeks.org/generative-adversarial-network-gan/.

(Continued)

*Primary Examiner* — Robert Chevalier
(74) *Attorney, Agent, or Firm* — Robert R. Aragona (57) ABSTRACT

An embodiment for simulating a live video presentation in a recorded video is provided. The embodiment may include receiving a previously recorded online meeting. The embodiment may also include transcribing and indexing the transcription of the previously recorded online meeting. The embodiment may further include receiving audio content from a user. The embodiment may also include searching for a response to the audio content in the transcription. The embodiment may further include in response to determining the response is found in the transcription, generating a solution for the audio content from the transcription. The embodiment may also include integrating the generated solution into the previously recorded online meeting. The embodiment may further include updating one or more video frames of the previously recorded online meeting based on the generated solution.

20 Claims, 6 Drawing Sheets

(56) References Cited

U.S. PATENT DOCUMENTS

| | | | |
|---|---|---|---|
| 2014/0169536 A1* | 6/2014 | Pegg | ................ H04M 3/42221 379/87 |
| 2016/0048583 A1 | 2/2016 | Ontko | |
| 2016/0065880 A1 | 3/2016 | Pearson | |
| 2018/0131732 A1 | 5/2018 | Aronoff | |
| 2020/0036909 A1 | 1/2020 | Caspi | |

OTHER PUBLICATIONS

Wang et al., "One-Shot Free-View Neural Talking-Head Synthesis for Video Conferencing", NVIDIA Corporation, CVPR 2021, Computer Vision Foundation, 11 pages. https://openaccess.thecvf.com/content/CVPR2021/papers/Wang_One-Shot_Free-View_Neural_Talking-Head_Synthesis_for_Video_Conferencing_CVPR_2021_paper.pdf.

Mell et al., "The NIST Definition of Cloud Computing", Recommendations of the National Institute of Standards and Technology, NIST Special Publication 800-145, Sep. 2011, 7 pages.

Brenier, "An Overview of Conversational AI", Mar. 15, 2017, 19 Pages. https://georgian.io/overview-of-conversational-ai/.

\* cited by examiner

SIMULATE LIVE VIDEO PRESENTATION IN A RECORDED VIDEO

BACKGROUND

The present invention relates generally to the field of computing, and more particularly to a system for simulating a live video presentation in a recorded video.

Video conferencing through a variety of desktop and mobile collaborative meeting applications, as well as collaborative meeting cloud and browser extensions, has become an effective interaction and communication tool that enables both small and large-scale companies to reduce travel and operational costs incurred in conducting in-person meetings. Demand for remote workforce management using these collaborative meeting applications has increased steadily in recent years due to rapid digital transformation and globalization. Such software is extremely helpful in bridging the distance between individuals in these small and large-scale companies and allowing them to view presented content. Several departments within the company may hold these video conferences simultaneously. In such instances, a viewer may attend a live online meeting and then watch a recorded online meeting on demand at a later time.

SUMMARY

According to one embodiment, a method, computer system, and computer program product for simulating a live video presentation in a recorded video is provided. The embodiment may include receiving a previously recorded online meeting. The embodiment may also include transcribing and indexing the transcription of the previously recorded online meeting. The embodiment may further include receiving audio content from a user. The embodiment may also include searching for a response to the audio content in the transcription. The embodiment may further include in response to determining the response is found in the transcription, generating a solution for the audio content from the transcription. The embodiment may also include integrating the generated solution into the previously recorded online meeting based on the audio content.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for simulating a live video presentation in a recorded video. The following described exemplary embodiments provide a system, method, and program product to, among other things, search for a response to audio content in a transcription of a previously recorded online meeting and, accordingly, integrate a generated solution into the previously recorded online meeting. Therefore, the present embodiment has the capacity to improve the technical field of video conferencing by enabling an active conversation between a user and a previously recorded online meeting.

As previously described, video conferencing through a variety of desktop and mobile collaborative meeting applications, as well as collaborative meeting cloud and browser extensions, has become an effective interaction and communication tool that enables both small and large-scale companies to reduce travel and operational costs incurred in conducting in-person meetings. Demand for remote workforce management using these collaborative meeting applications has increased steadily in recent years due to rapid digital transformation and globalization. Such software is extremely helpful in bridging the distance between individuals in these small and large-scale companies and allowing them to view presented content. Several departments within the company may hold these video conferences simultaneously. In such instances, a viewer may attend a live online meeting and then watch a previously recorded online meeting at a later time. The viewers may be those who were unable to join the live online meeting and are those who view and/or interact with the previously recorded online meeting. These previously recorded meetings lack the interactivity of live online meetings due to their one-way communication setting (i.e., from the recording to the user). For example, a user may not be able to ask a question when viewing a previously recorded meeting. This problem is typically addressed by uploading presentation slides, such as Microsoft® PowerPoint® (Microsoft PowerPoint and all Microsoft PowerPoint-based trademarks and logos are trademarks or registered trademarks of Microsoft Corporation and/or its affiliates), and recorded demos, etc., upon the completion of the live online meeting regarding the presented content of the live online meeting. However, these slides and recorded demos may not contain relevant content to a particular user and do not modify the content of the live online meeting. It may therefore be imperative to have a system in place to enable an active conversation between the user and the previously recorded online meeting. Thus, embodiments of the present invention may provide advantages including, but not limited to, allowing a user to interact with previously recorded content at the user's preferred time, enabling a user to ask clarification questions when viewing a previously recorded online meeting, and predicting future questions that may be asked by a user who is viewing the previously recorded online meeting. The present invention does not require that all advantages need to be incorporated into every embodiment of the invention.

According to at least one embodiment, a user may be watching a previously recorded online meeting. The previously recorded online meeting may be transcribed and the transcription of the previously recorded online meeting may be indexed so that a response to audio content from the user may be searched for in the transcription. According to at least one embodiment, the audio content may be a question that is asked by the user. According to at least one other embodiment, the audio content may be an answer or comment provided by the user. In response to determining the response is found in the transcription, a solution for the audio content may be generated from the transcription in order to integrate the generated solution into the previously recorded online meeting based on the audio content. When the response is not available in the transcription of the previously recorded online meeting, or the generated solution is below a certain confidence level with respect to benchmark solutions, the system may pull data from external data sources (e.g., YouTube® (YouTube and all YouTube-based trademarks and logos are trademarks or registered trademarks of Google LLC and/or its affiliates)) to generate and/or improve the solution. According to at least one embodiment, the generated solution may be in the form of text or graphical form presented to the user. According to at least one other embodiment, the generated solution may be a voice response. According to at least one further embodiment, the generated solution may be a visual graphic. Based on the generated solution, one or more video frames of the previously recorded online meeting may be updated. According to at least one other further embodiment, the system may further analyze multiple solutions generated for multiple users and update the previously recorded online meeting accordingly.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to search for a response to audio content in a transcription of a previously recorded online meeting and, accordingly, integrate a generated solution into the previously recorded online meeting.

Figure 1:
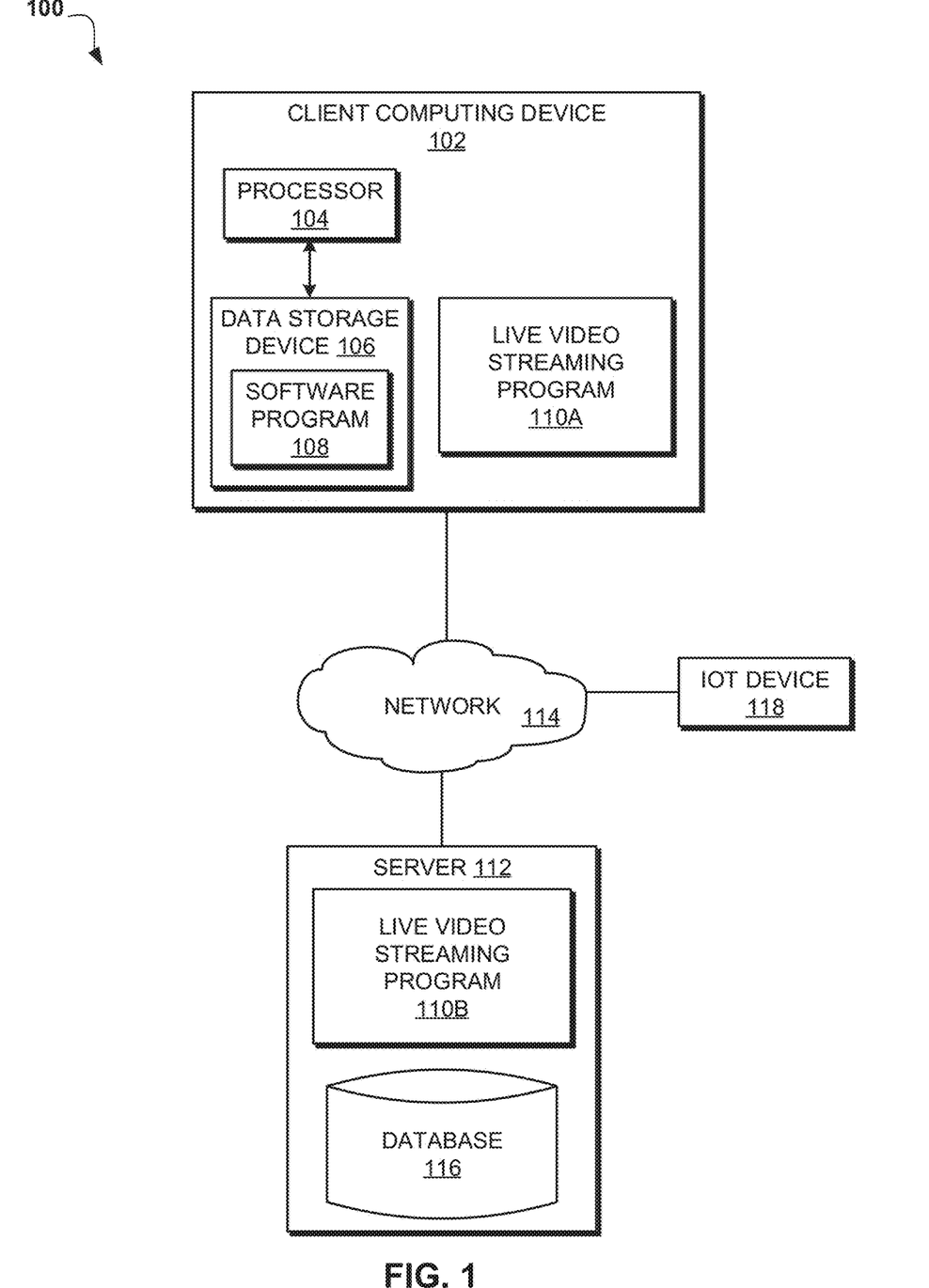
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102, a server 112, and Internet of Things (IoT) Device 118 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a live video streaming program 110A and communicate with the server 112 and IoT Device 118 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a live video streaming program 110B and a database 116 and communicating with the client computing device 102 and IoT Device 118 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

IoT Device 118 may be a microphone or camera embedded in or external to the client computing device 102, a smartwatch, and any other IoT Device 118 known in the art for capturing audio output and/or gestures of a user that is capable of connecting to the communication network 114, and transmitting and receiving data with the client computing device 102 and the server 112.

According to the present embodiment, the live video streaming program 110A, 110B may be a program capable of receiving audio content from a user who is watching a previously recorded online meeting, generating a solution for the audio content from the user, integrating the generated solution into the previously recorded online meeting, allowing the user to interact with previously recorded content at their preferred time, enabling the user to ask clarification questions or make comments to improve the usability of the previously recorded content when viewing the previously recorded online meeting, and predicting future questions that may be asked by the user who is viewing the previously recorded online meeting. The live video simulation method is explained in further detail below with respect to FIG. 2.

Figure 2:
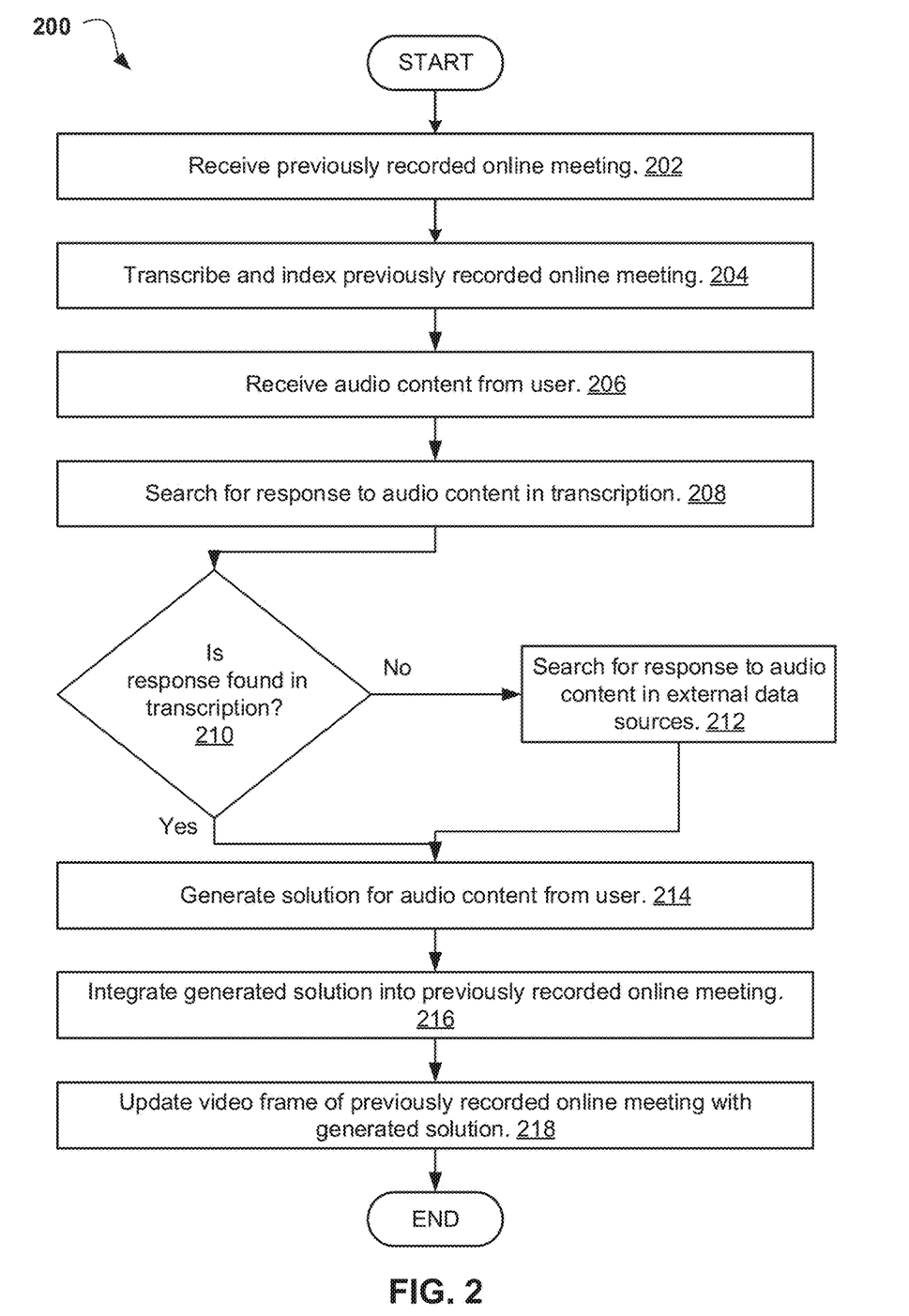
FIG. 2 illustrates an operational flowchart for simulating a live video presentation in a recorded video in a live video presentation simulation process according to at least one embodiment.

Referring now to FIG. 2, an operational flowchart for simulating a live video presentation in a recorded video in a live video presentation simulation process 200 is depicted according to at least one embodiment. At 202, the live video streaming program 110A, 110B receives the previously recorded online meeting. The previously recorded online meeting may be a recording from a live online meeting in a collaborative meeting application, such as Cisco Webex® (Cisco Webex and all Cisco Webex-based trademarks and logos are trademarks or registered trademarks of Cisco Systems, Inc. and/or its affiliates). Often in collaborative meeting applications, a meeting host or presenter may choose to record a meeting that is streamed live to attendees.

When these live online meetings are recorded, any content that was presented to the live attendees may also be presented to a user who is watching the previously recorded online meeting. As used herein, an "attendee" is an individual who is watching the live online meeting, and a "user" is an individual who is watching the previously recorded online meeting. For example, the user may hear a lecture given by the meeting host and see presentation slides that were uploaded by the meeting host. The user may also hear any questions that were asked by the attendees of the live online meeting. This content may be transcribed and indexed, which is described in further detail below with respect to step 204.

Then, at 204, the live video streaming program 110A, 110B transcribes the previously recorded online meeting and indexes the transcription. Once the previously recorded online meeting is made available on demand and received by the live video streaming program 110A, 110B, the presentation content may be extracted from the previously recorded online meeting. The extracted presentation content may be transcribed, indexed, and stored in a database, such as database 116. For example, any documents presented during the live online meeting may be transcribed, along with slides and audio. Using content analytics, key events in the presentation content may be identified. Examples of key events include, but are not limited to, questions asked by the attendees during the live online meeting, the answers to those questions (e.g., solutions) given by the meeting host or presenter, and when an attendee uses the "raise hand" button on the user interface (UI) of the collaborative meeting application. A timestamp of each of these key events may also be indexed.

The key events may be used to create a machine learning-based knowledge graph. For example, one or more question and answer pairs may be identified, extracted, and incorporated into the knowledge graph. According to at least one embodiment, content extracted from one or more external data sources may be added to the knowledge graph to enrich the knowledge graph, described in further detail below with respect to step 212. Utilizing the knowledge graph, the live video streaming program 110A, 110B may predict one or more anticipated questions based on the one or more extracted question and answer pairs. For example, if the attendee in a live online meeting given by a retail company asks the question, "How many products were sold during the fourth quarter of 2020?", the live video streaming program 110A, 110B may anticipate questions about product sales during the first, second, and third quarters of the same year and/or additional years, and generate answers accordingly.

A summary table may be built based on the knowledge graph and presented to the user. The summary table may be in a different format than that of the knowledge graph. For example, the knowledge graph may encode topics covered in each section of the previously recorded online meeting, timestamps of video frames, heatmaps of previously discussed questions, and content received from external data sources. The knowledge graph may also encode tracked and monitored events in each section of the live online meeting, such as the number of attendees who used the "raise hand" button during a particular slide or which meeting host or presenter had the greatest number of viewers. The summary table may include the information contained in the knowledge graph, but the summary table may be presented in a format which could be easily read or heard by a human. For example, according to at least one embodiment, the summary table may be presented to the user using bullet formatting. According to at least one other embodiment, the summary table may be presented to the user via audio.

Next, at 206, the live video streaming program 110A, 110B receives the audio content from the user. In order to receive the audio content, the IoT Device 118, such as the microphone embedded in or external to the client computing device 102, may be deployed and integrated with the live video streaming program 110A, 110B. The audio content may be processed using a natural language processing (NLP) model. The NLP model may be used to analyze the tone and context of the audio content (i.e., whether the user is asking a question, answering a question, or commenting on an answer to a question). For example, if the user has a more enthusiastic tone, it may be determined the user is attempting to respond to a question that they know the answer to or add further explanation that may improve the usability of the previously recorded content. The context of the audio content may then be validated. For example, the user who is watching the previously recorded online meeting may be interrupted by another individual, and may start talking to the other individual. In this example, the "audio content" would have no relevance to the topics discussed in the previously recorded online meeting, and therefore it may be verified that the user is not actually interacting with the previously recorded online meeting. As used herein, an "interaction" means any audio content provided by the user that is relevant to the previously recorded online meeting. In another example, the user may be attempting to answer a question posed by one of the attendees in the live online meeting. The provided answer by the user may also be validated to determine whether the answer is correct.

Once the context is validated, the knowledge graph described above with respect to step 204 may be updated or refreshed with the interactions of the user. For example, if the user asks a question while watching the previously recorded online meeting, that question, and its associated answer, may be added to the one or more question and answer pairs in the knowledge graph. Thus, new content may be added to the knowledge graph as the user interacts with the previously recorded online meeting.

According to at least one other embodiment, the user's body language may be captured when the audio content is received. In order to capture the user's body language, the IoT Device 118, such as the camera embedded in or external to the client computing device 102 and/or the smartwatch, may be deployed and integrated with the live video streaming program 110A, 110B. For example, the user may be making gestures while speaking, such as pointing at the screen of the device playing the previously recorded online meeting, physically raising their hand, moving around in their chair, and/or shaking their head. For example, if the user raises their hand, the live video streaming program 110A, 110B may determine the user intends to ask a question, whereas if the user shakes their head, it may be determined the user intends to provide an answer to the question.

Then, at 208, the live video streaming program 110A, 110B searches for the response to the audio content in the transcription. Thus, the initial search may be a local search (i.e., the response is searched for in the contents of the previously recorded online meeting). The response may depend on the context. For example, if the user asks a question, the live video streaming program 110A, 110B may search for an answer to the question and the response would be an answer. In another example, if the user answers a question, the live video streaming program 110A, 110B may search the knowledge graph to verify the user provided answer is correct, and if the answer is not correct the response would be the correct answer.

Next, at 210, the live video streaming program 110A, 110B determines whether the response is found in the transcription. As described above with respect to step 208, the initial search may be a local search (i.e., external data sources are not searched). For example, if the user asks a question, the live video streaming program 110A, 110B may explore the knowledge graph for the predicted one or more anticipated questions and their associated answers. If an anticipated question can be correlated with the user's actual question, then the live video streaming program 110A, 110B may determine the response is found in the transcription. In another example, the user may ask a question that the meeting host or presenter answered during the lecture. In this case, it may also be determined the response is found in the transcription. In response to determining the response is not found in the transcription (step 210, "No" branch), the live video presentation simulation process 200 proceeds to step 212 to search for the response to the audio content in the one or more external data sources. In response to determining the response is found in the transcription (step 210, "Yes" branch), the live video presentation simulation process 200 proceeds to step 214 to generate the solution for the audio content.

Then, at 212, the live video streaming program 110A, 110B searches for the response to the audio content in the one or more external data sources. As described above, if the response cannot be found in the transcription, the response may be found in the one or more external data sources. According to at least one other embodiment, when the response is not available in the transcription of the previously recorded online meeting, or the generated solution is below a certain confidence level (e.g., less than 50% confident) with respect to benchmark solutions, the live video streaming program 110A, 110B may pull data from external data sources (e.g., YouTube® (YouTube and all YouTube-based trademarks and logos are trademarks or registered trademarks of Google LLC and/or its affiliates)) to generate and/or improve the solution. Examples of data sources include, but are not limited to, websites, search engines, and/or other public or private company databases containing content relating to the topics of the previously recorded online meeting. Continuing the example above, the user may ask the question, "How many products were sold in the first quarter of 2019?" The transcription may, however, only contain data relating to sales during the four quarters of 2020. In this example, the one or more external data sources may be searched for sales data in 2019. Similarly, if the user provides an answer to a question asked by the attendee during the live video meeting, that answer may be validated by searching the one or more external data sources. Any answers found in the one or more external data sources may be added to the knowledge graph as described above with respect to step 204.

Next, at 214, the live video streaming program 110A, 110B generates the solution for the audio content. According to at least one embodiment, if the response to the audio content is found in the transcription, the solution is generated for the audio content from the transcription. According to at least one other embodiment, if the response to the audio content is not found in the transcription, the solution is generated for the audio content from the one or more external data sources. In either embodiment, the generated solution may be in the form of text, voice, and/or graphical form, such as an animation or emoji. Continuing the example above, the user may ask the question in a certain manner, such as, "Did I sell more than 500 products during the fourth quarter of 2020?" The response may then be searched for and if the answer is yes, a thumbs up emoji and/or a voice saying "yes" may be the solution generated. Continuing this example, the user may make a comment, such as, "I completed all of my sales goals for the 2020 fiscal year?" In this case, a "Great Job" animation may be the solution generated.

According to at least one embodiment, the generated solution may be personalized based on the audio content from the user. For example, the generated solution may be a detailed answer if the user says, "Give me an in-depth analysis on how many products were sold during the fiscal year 2020." In this case, the generated solution may include such information as the sales numbers for each member of the company, where the products were sold, who shipped the products, etc. Contrarily, the generated solution may be a summarized answer if the user says, "Give me a brief analysis on how many products were sold during the fiscal year 2020." In this case, the generated solution may only include the number of sales per quarter and a final tally for the fiscal year. According to at least one other embodiment, the user may select their preference for the generated solution from the UI of the collaborative meeting application. For example, the user may specify whether they would like a detailed answer or a summarized answer.

Then, at 216, the live video streaming program 110A, 110B integrates the generated solution into the previously recorded online meeting. The generated solution is integrated based on the audio content from the user. The generated solution may be integrated into the previously recorded online meeting by identifying the relevant sections of the previously recorded online meeting and incorporating that generated solution into the previously recorded online meeting. As described above with respect to step 204, the presentation content of the previously recorded online meeting may be transcribed and indexed. Thus, when the user asks a question or gives an answer to a question, the index may be searched and the relevant sections of the previously recorded online meeting may be identified. Upon identifying the relevant sections of the previously recorded online meeting, the live video streaming program 110A, 110B may rewind or fast-forward from a current timepoint of the user in the previously recorded online meeting, or may stay at the current timepoint if the relevant section is being currently viewed. For example, if the user's question immediately follows a topic discussed by the presenter or meeting host, the generated solution may be incorporated into that portion of the online collaborative meeting without rewinding or fast-forwarding. The generated solution may thus alter the presentation content such that the presentation content in the previously recorded online meeting now includes the user's question and the meeting host's answer to that question. For example, the generated solution may be a simulation of a two-way communication between the user and the meeting host or presenter. Furthermore, the meeting host's answer may be incorporated into the video, along with appropriate gestures of the meeting host when answering the question or commenting on the user's answer to the question. According to at least one embodiment, any unnecessary content may be removed from the previously recorded online meeting. For example, if the user says, "Wait a minute," before asking a question, that term may be considered redundant and thus may not be incorporated into the previously recorded online meeting.

While having a simulated conversation with the meeting host or presenter, the tone of the simulated reply from the meeting host or presenter may be altered to match the actual voice of the meeting host or presenter, in terms of frequency, pitch, and speed of the voice. In this manner, the user may feel like they are interacting with an actual person rather than a chatbot.

Next, at 218, the live video streaming program 110A, 110B updates one or more video frames of the previously recorded online meeting. The one or more video frames are updated based on the generated solution. According to at least one embodiment, a generative adversarial network (GAN) may be utilized to update the one or more video frames. Details on the GAN are described in further detail below with respect to FIG. 3. Since the simulated reply from the meeting host or presenter is not a part of the live online meeting, the generated solution integrated into the previously recorded online meeting may not align with the original video frames (i.e., the simulated reply from the meeting host or presenter may not be synchronized with the lip movements of the meeting host or presenter). To resolve this issue, the GAN is implemented as described with respect to FIG. 3. According to at least one other embodiment, the live video streaming program 110A, 110B may further analyze multiple solutions generated for multiple users and update the previously recorded online meeting accordingly. In this manner, different users may see the updated version of the previously recorded online meeting.

Figure 3:
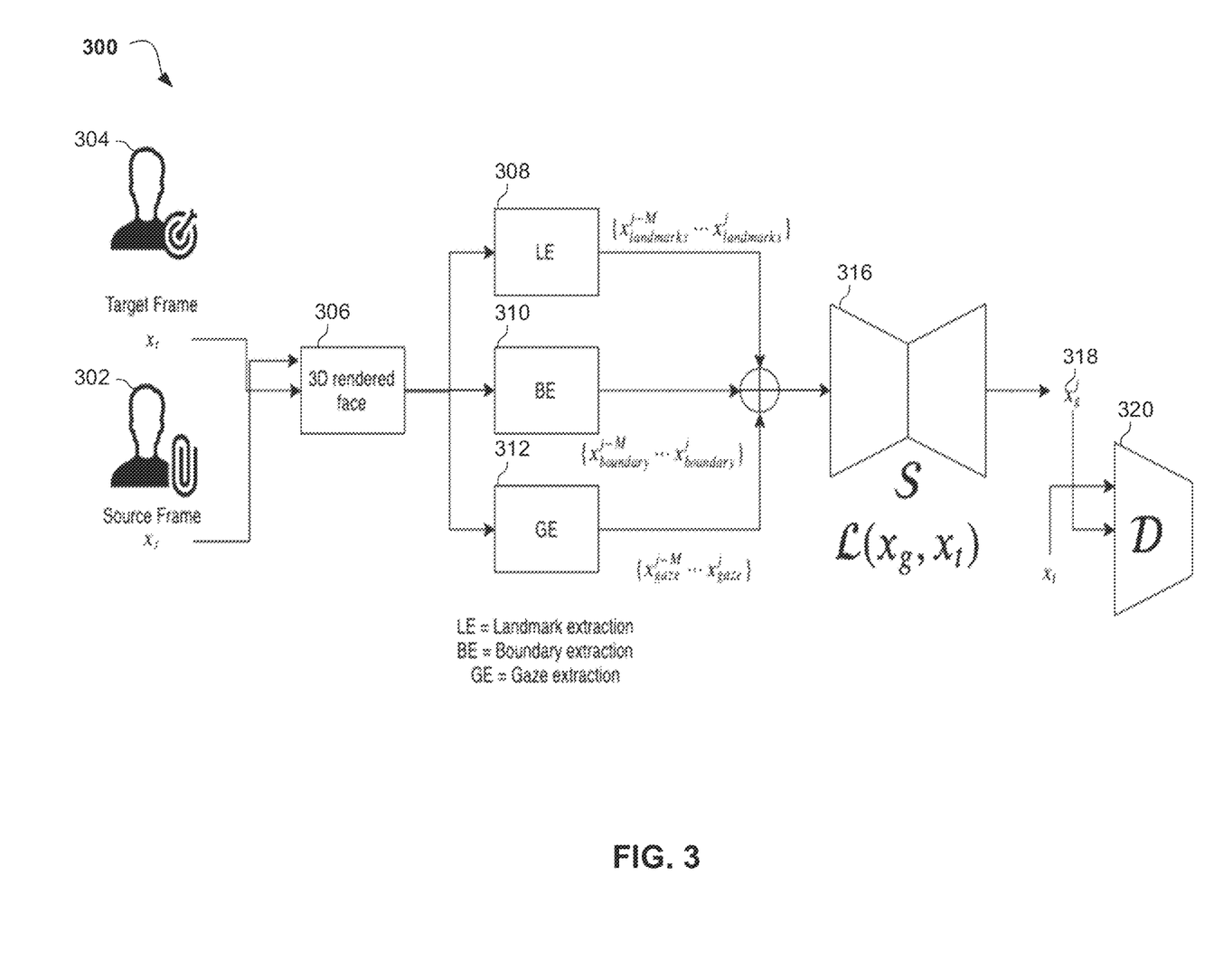
FIG. 3 is a diagram depicting solution components for generating video frames based on interactions with a user according to at least one embodiment.

Referring now to FIG. 3, a diagram 300 depicting solution components for generating video frames based on interactions with a user is shown according to at least one embodiment. First, the video frames to be updated with the new presentation content may be identified. The video frames to be updated may be identified from the relevant sections of the previously recorded online meeting. These are the video frames where the simulated reply from the meeting host or presenter will be incorporated. In this manner, the lip movements and other gestures of the meeting host or presenter may be synchronized with the simulated reply. Using a source frame $x_s$ 302, a basic texture of the video and individual features from the video frames, including a 3D rendered facial image 306, background images, and/or any graphical illustrations may be extracted and a target frame $x_t$ 304 may be estimated by the number of movements needed for the generated solution. Alternatively, the last frame from the original video may be used as the target value that will be concatenated with the newly generated video. The target frame $x_t$ 304 may be estimated based on the simulated reply from the meeting host or presenter. The target frame $x_t$ 304 may be a video frame that is expected when the generated solution (i.e., the simulated reply), is incorporated into the video of the previously recorded online meeting. Having the source frame $x_s$ 302 and the target frame $x_t$ 304, multiple face frames may be generated by the GAN from s to t. For each frame, a landmark for facial expression 308 may be extracted (e.g., lip and mouth movements of the meeting host or presenter). A 3D face boundary 310 may also be extracted to track the head position movements of the meeting host or presenter. Additionally, a mask for an expected gaze 312 of the meeting host or presenter while speaking the simulated reply may be extracted. For example, the meeting host or presenter may look up when speaking the simulated reply. The landmark for facial expression 308, the 3D face boundary 310, and the mask for the expected gaze 312 may be concatenated and fed to a variational autoencoder (VAE) 316. The VAE 316 may be the generator network of the GAN. The VAE 316 may output a generated frame $x_g$ 318. The generated frame $x_g$ 318 may be the video frame incorporated into the previously recorded online meeting assuming it is realistic. To determine whether the generated frame $x_g$ 318 is realistic, the target frame $x_t$ 304 and the generated frame $x_g$ 318 may be fed into the discriminator network 320 of the GAN. The objective of the generator network is to trick the discriminator network 320 into thinking the generated frame $x_g$ 318 is realistic. If the discriminator network 320 is tricked into thinking the generated frame $x_g$ 318 is realistic, the generated frame $x_g$ 318 may be used to update the one or more video frames of the previously recorded online meeting. If the generated frame $x_g$ 318 is not realistic, however, the training may continue by feeding the landmark for facial expression 308, the 3D face boundary 310, and the mask for the expected gaze 312 back into the VAE 316.

It may be appreciated that FIGS. 2 and 3 provide only an illustration of one implementation and do not imply any limitations with regard to how different embodiments may be implemented. Many modifications to the depicted environments may be made based on design and implementation requirements.

Figure 4:
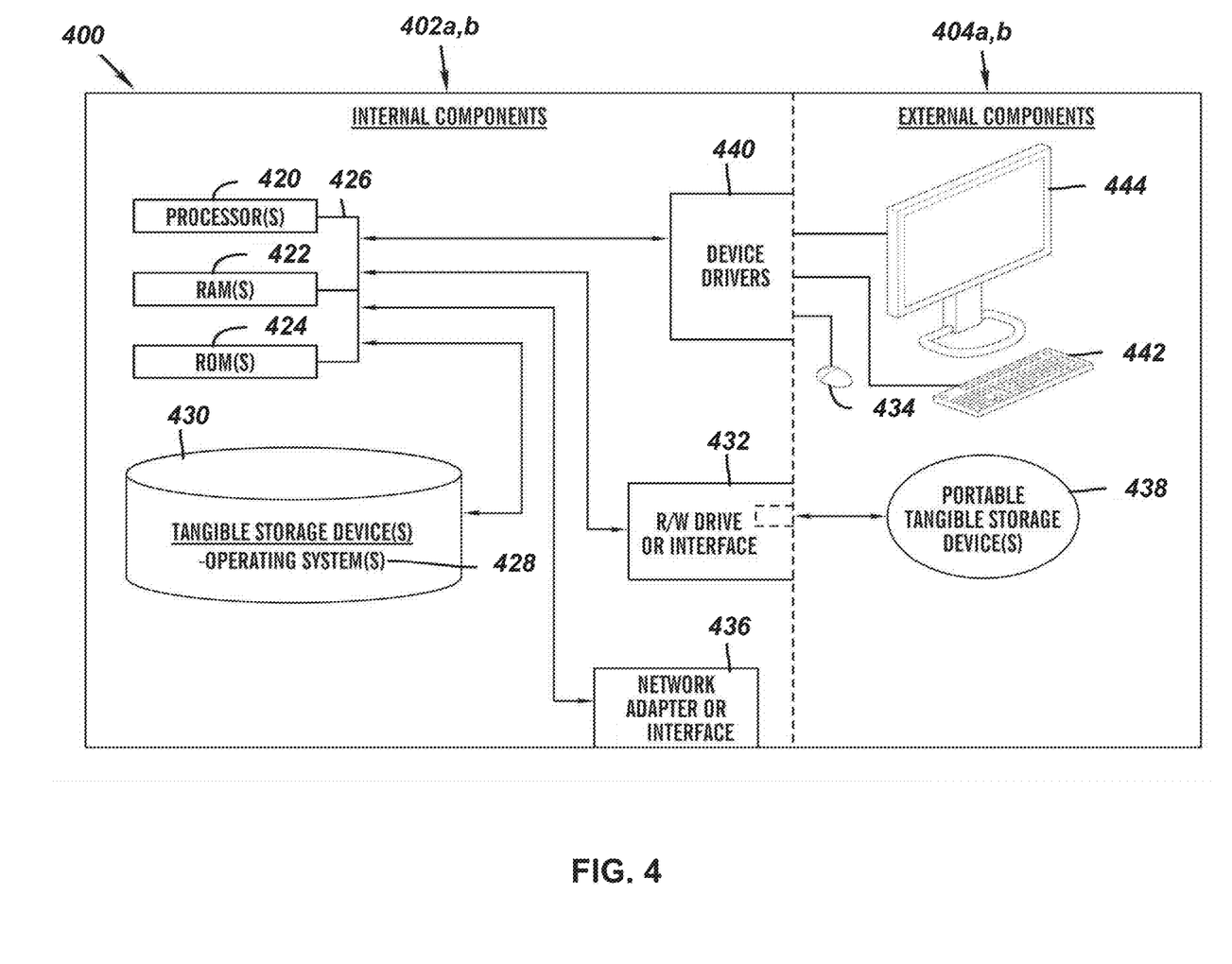
FIG. 4 is a functional block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the live video streaming program 110A in the client computing device 102 and the live video streaming program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 *a,b* also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the live video streaming program 110A, 110B, can be stored on one or more of the respective portable computer-readable tangible storage devices 438, read via the respective R/W drive or interface 432, and loaded into the respective hard drive 430.

Each set of internal components 402 *a,b* also includes network adapters or interfaces 436 such as a TCP/IP adapter cards, wireless Wi-Fi interface cards, or 3G or 4G wireless interface cards or other wired or wireless communication links. The software program 108 and the live video streaming program 110A in the client computing device 102 and the live video streaming program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the live video streaming program 110A in the client computing device 102 and the live video streaming program 110B in the server 112 are loaded into the respective hard drive 430. The network may comprise copper wires, optical fibers, wireless transmission, routers, firewalls, switches, gateway computers and/or edge servers.

Each of the sets of external components 404 *a,b* can include a computer display monitor 444, a keyboard 442, and a computer mouse 434. External components 404 *a,b* can also include touch screens, virtual keyboards, touch pads, pointing devices, and other human interface devices. Each of the sets of internal components 402 *a,b* also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
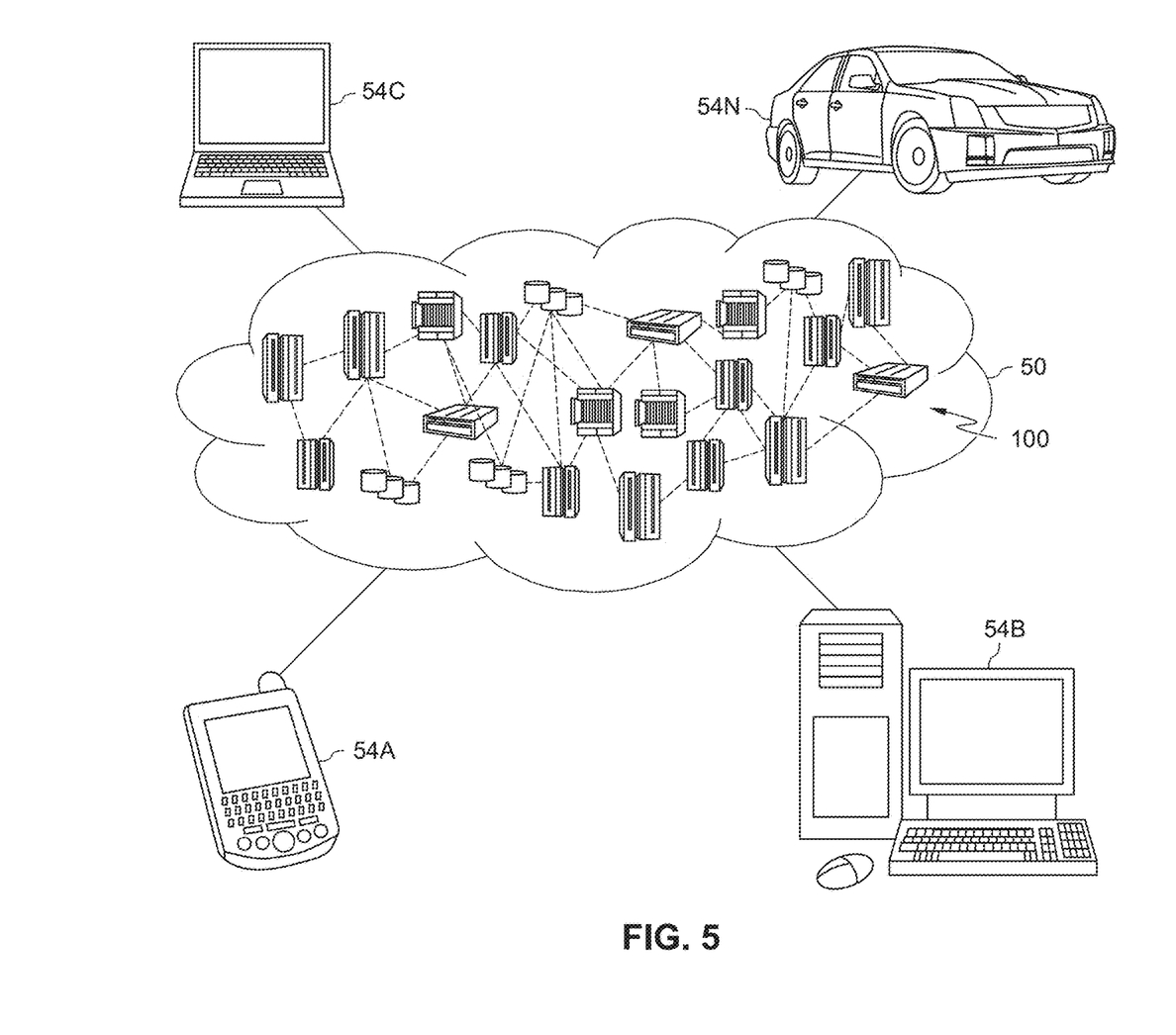
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
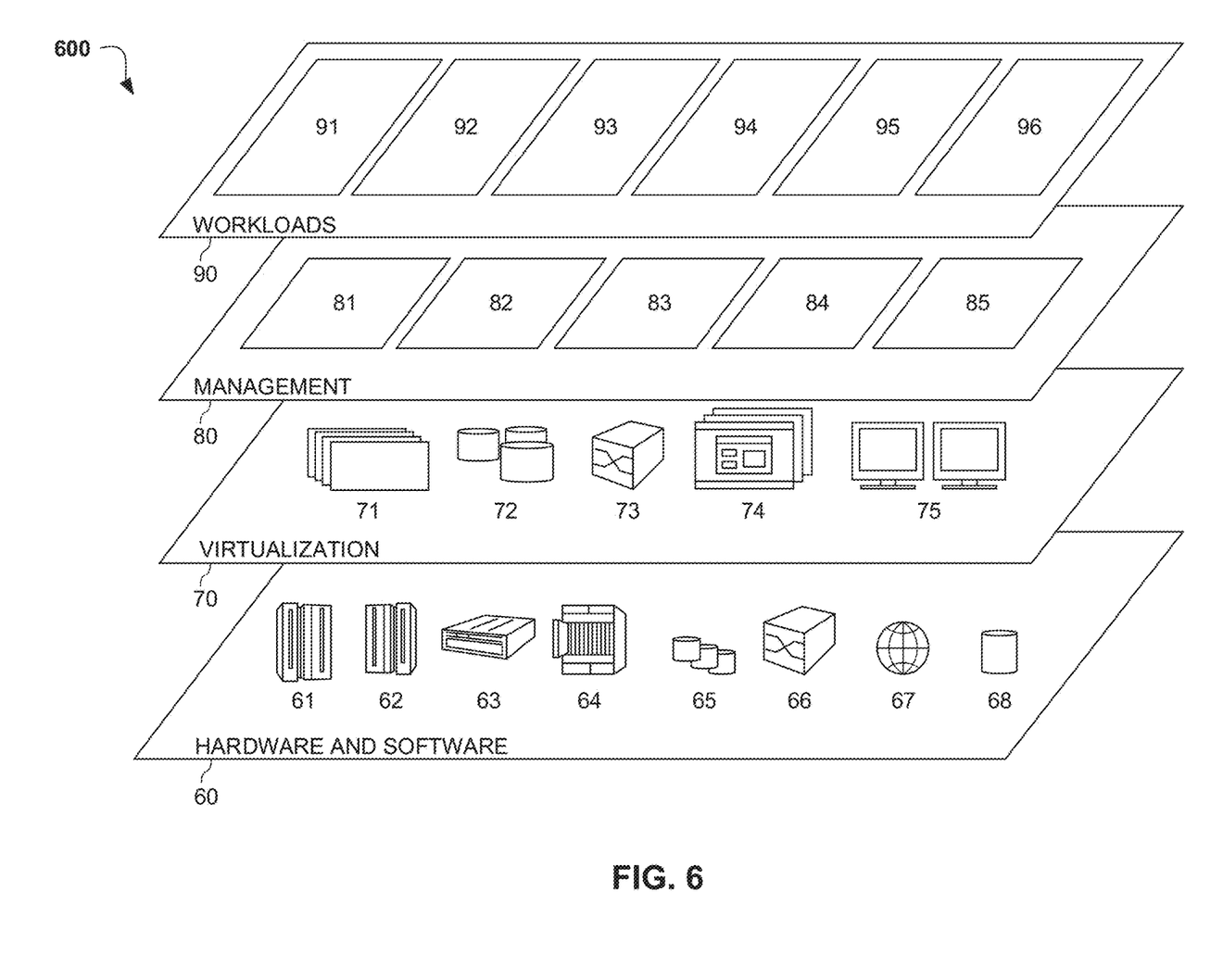
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and simulating a live video presentation in a recorded video 96. Simulating a live video presentation in a recorded video 96 may relate to searching for a response to audio content in a transcription of a previously recorded online meeting in order to integrate a generated solution into the previously recorded online meeting.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of simulating a live video presentation in a recorded video, the method comprising:
   receiving a previously recorded online meeting;
   transcribing and indexing the transcription of the previously recorded online meeting;
   receiving audio content from a user;
   searching for a response to the audio content in the transcription;
   determining whether the response is found in the transcription;
   in response to determining the response is found in the transcription, generating a solution for the audio content from the transcription; and
   integrating the generated solution into the previously recorded online meeting based on the audio content.

2. The computer-based method of claim 1, further comprising:
   in response to determining the response is not found in the transcription, searching for the response to the audio content in one or more external data sources; and
   generating the solution for the audio content from the one or more external data sources.

3. The computer-based method of claim 2, further comprising:
   updating one or more video frames of the previously recorded online meeting based on the generated solution.

4. The computer-based method of claim 2, wherein the generated solution is selected from a group consisting of text, voice, and a visual graphic.

5. The computer-based method of claim 2, wherein a generative adversarial network (GAN) is utilized to update the one or more video frames.

6. The computer-based method of claim 2, wherein the transcribing and the indexing of the transcription of the previously recorded online meeting further comprises:
   extracting one or more question and answer pairs from the previously recorded online meeting;
   creating a knowledge graph based on the one or more extracted question and answer pairs; and predicting one or more anticipated questions based on the one or more extracted question and answer pairs.

7. The computer-based method of claim 6, wherein a summary table is built based on the knowledge graph and presented to the user.

8. A computer system, the computer system comprising:
one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
receiving a previously recorded online meeting;
transcribing and indexing the transcription of the previously recorded online meeting;
receiving audio content from a user;
searching for a response to the audio content in the transcription;
determining whether the response is found in the transcription;
in response to determining the response is found in the transcription, generating a solution for the audio content from the transcription; and
integrating the generated solution into the previously recorded online meeting based on the audio content.

9. The computer system of claim 8, further comprising:
in response to determining the response is not found in the transcription, searching for the response to the audio content in one or more external data sources; and
generating the solution for the audio content from the one or more external data sources.

10. The computer system of claim 9, further comprising:
updating one or more video frames of the previously recorded online meeting based on the generated solution.

11. The computer system of claim 9, wherein the generated solution is selected from a group consisting of text, voice, and a visual graphic.

12. The computer system of claim 9, wherein a generative adversarial network (GAN) is utilized to update the one or more video frames.

13. The computer system of claim 9, wherein the transcribing and the indexing of the transcription of the previously recorded online meeting further comprises:
extracting one or more question and answer pairs from the previously recorded online meeting;
creating a knowledge graph based on the one or more extracted question and answer pairs; and
predicting one or more anticipated questions based on the one or more extracted question and answer pairs.

14. The computer system of claim 13, wherein a summary table is built based on the knowledge graph and presented to the user.

15. A computer program product, the computer program product comprising:
one or more computer-readable tangible storage medium and program instructions stored on at least one of the one or more tangible storage medium, the program instructions executable by a processor capable of performing a method, the method comprising:
receiving a previously recorded online meeting;
transcribing and indexing the transcription of the previously recorded online meeting;
receiving audio content from a user;
searching for a response to the audio content in the transcription;
determining whether the response is found in the transcription;
in response to determining the response is found in the transcription, generating a solution for the audio content from the transcription; and
integrating the generated solution into the previously recorded online meeting based on the audio content.

16. The computer program product of claim 15, further comprising:
in response to determining the response is not found in the transcription, searching for the response to the audio content in one or more external data sources; and
generating the solution for the audio content from the one or more external data sources.

17. The computer program product of claim 16, further comprising:
updating one or more video frames of the previously recorded online meeting based on the generated solution.

18. The computer program product of claim 16, wherein the generated solution is selected from a group consisting of text, voice, and a visual graphic.

19. The computer program product of claim 16, wherein a generative adversarial network (GAN) is utilized to update the one or more video frames.

20. The computer program product of claim 16, wherein the transcribing and the indexing of the transcription of the previously recorded online meeting further comprises:
extracting one or more question and answer pairs from the previously recorded online meeting;
creating a knowledge graph based on the one or more extracted question and answer pairs; and
predicting one or more anticipated questions based on the one or more extracted question and answer pairs.

* * * * *